United States Patent
Cheng et al.

(10) Patent No.: US 6,697,203 B1
(45) Date of Patent: Feb. 24, 2004

(54) METHOD FOR DETERMINING LIFETIME FOR MEDIA THERMAL DECAY

(75) Inventors: Nelson Cheng, Fremont, CA (US); Bill Higgins, Palo Alto, CA (US); Hai Nguy, San Jose, CA (US); Steven Stupp, Mountain View, CA (US); Steven Lambert, San Jose, CA (US)

(73) Assignee: Maxtor Corporation, Milpitas, CA (US)

( * ) Notice: Subject to any disclaimer, the term of this patent is extended or adjusted under 35 U.S.C. 154(b) by 0 days.

(21) Appl. No.: 09/578,262

(22) Filed: May 24, 2000

(51) Int. Cl.⁷ .............................................. G11B 27/36
(52) U.S. Cl. .......................................... 360/31; 360/53
(58) Field of Search .............................. 360/31, 53, 25

(56) References Cited

U.S. PATENT DOCUMENTS

| | | | |
|---|---|---|---|
| 5,889,784 A | * | 3/1999 | Rogers ........................ 714/704 |
| 6,266,199 B1 | * | 7/2001 | Gillis et al. .................... 360/31 |
| 6,429,984 B1 | * | 8/2002 | Alex ............................ 360/31 |

OTHER PUBLICATIONS

"Thermal Effects & Recording Performance at High Recording Densities", M. Alex and D. Wachenschwanz, IEE Trans. Mag., V. 35, pp. 2796–2801 (1999).

"Time Dependence of Switching Fields in Magnetic Recording Media", M.P. Sharrock, J. Appl. Phys., v. 76 (10), pp. 6413–6418 (1994).

* cited by examiner

*Primary Examiner*—David Hudspeth
*Assistant Examiner*—Varsha A. Kapadia

(57) ABSTRACT

A method and apparatus for determining a lifetime for a medium to fail due to thermal decay of a magnetization pattern is provided. Different stress magnetic fields are applied to a write head for writing to a machine-readable medium resulting in a magnetic field on the medium. A time to failure, corresponding to each of the different stress magnetic fields, is determined, the time to failure being an amount of time for an amplitude of a signal on the medium to degrade beyond a predetermined failure criteria. A time to failure without a stress magnetic field is determined based on the corresponding times to failure determined for each of the different stress currents.

29 Claims, 13 Drawing Sheets

A910 — ELEVATE TEMPERATURE OF MEDIUM

A912 — REPEAT ACTS A800-A814 TO DETERMINE TTF WITHOUT STRESS AT AN ELVATED TEMPERATURE

FIG. 9

METHOD FOR DETERMINING LIFETIME FOR MEDIA THERMAL DECAY

RESERVATION OF COPYRIGHT

This patent document contains material subject to copyright protection. The copyright owner has no objection to the facsimile reproduction by anyone of the patent document, as it pears in the U.S. Patent and Trademark Office patent files or records, but otherwise reserves all copyright rights whatsoever.

BACKGROUND OF THE INVENTION

1. Field of the Invention

Aspects of the invention relate to a method for estimating media thermal decay based on error rate failure criteria.

2. Description of Background Information

One of the biggest problems for high density recording media is media thermal decay. Until now, no one has proposed da feasible method to quantitatively predict media thermal decay lifetime based on real drive level failure criteria. Much of the published literature has discussed how to determine whether a medium is stable or unstable using a media stability factor, KuV/kT, where Ku is anisotropic energy of a media alloy, V is a switching volume, k is a Boltzmann constant, and T is a media temperature. However, no method has been reported that quantitatively determines the media thermal decay lifetime. Some of the reasons for this may be that the previously used failure criteria for media thermal decay is not well defined or directly related to drive performance, lifetime determination was based mostly on modeled results, and simple test acceleration and straightforward extrapolation from accelerated to non-accelerated conditions were never demonstrated.

Other approaches that have been proposed have included:

a) using critical current to detect noise peaks where the magnetic moment reaches zero. See "Thermal Effects & Recording Performance at High Recording Densities", by M. Alex & D. Wachenschwanz, IEEE Trans. Mag., Vol 35, page 2796 (1999); and b) using the time dependence of Hc based on the Sharrock equation to estimate decay time. See "Time Dependence of Switching Fields in Magnetic Recording Media", by M. P. Sharrock, J. Appl. Phys., vol 15, page 6413 (1994).

SUMMARY

An embodiment of the invention is a method for determining a thermal decay lifetime of a machine-readable medium at a given temperature. A test pattern is written to a portion of the medium. An initial amiplitude of signals on the portion of the medium is measured, A first stress magnetic field is applied to the portion of the medium. After applying the first stress magnetic field, a first amplitude of signals on the portion of the medium is measured. The test pattern is rewritten to the portion of the medium. A second stress magnetic field is applied to the portion of the medium. After the applying of the second stress magnetic field, a second amplitude of signals on the portion of the medium is measured. A time to failure is determined corresponding to the first and the second stress, magnetic fields, respectively, the time to failure being an amount of time, measured from a corresponding reference time, for a respective amplitude of the signals on the medium to degrade, in relation to the initial amplitude, beyond a predetermined failure criteria. A time to failure without applying a stress magnetic field is determined based on a relationship between the corresponding times to failure determined for each of the applied stress magnetic fields and Ln(the corresponding times to failure).

BRIEF DESCRIPTION OF THE DRAWINGS

The above and other objects, features, and advantages of the present invention are further described in the Detailed Description which follows, with reference to the drawings by way of non-limiting exemplary embodiments of the invention, wherein like reference numerals represent similar parts of the present invention throughout the several views and wherein:

FIG. 9 is a flowchart for explaining the process of determining thermal decay lifetime for a medium when the medium, in a spin stand unit, is at an elevated temperature;

DESCRIPTION

A practical method to experimentally determine a quantitative lifetime for media thermal decay should include several elements. The failure criteria used has to be correlated with real drive performance. A simple and practical stress method for acceleration should be well established because the media signal for real products will not show any noticeable decay during the test period without being stressed. In an embodiment of the invention, the magnetic field produced by passing a small current through the write head is chosen to do the stress (hereinafter, stress current). The magnetic field stress does not need to come from an electromagnet, but can result from another magnetic field creation method, for example, a permanent magnet. In order to estimate lifetime of the media, time dependence of a testing parameter should be clearly identified. Extrapolation from a stressed to a non-stressed condition should be simple and should be experimentally established.

Two different approaches will be described, a drive level approach and a component level approach.

Figure 1:
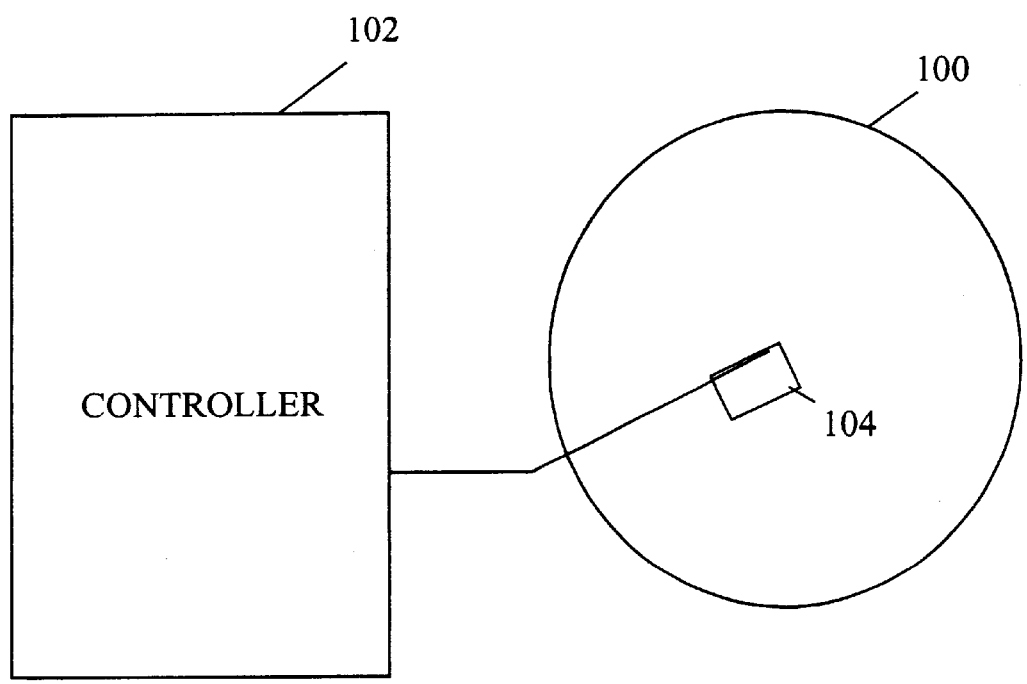
FIG. 1 is a schematic view of a disk drive unit.

For drive level testing, FIG. 1 shows an example of a disk drive unit. The disk drive unit includes a disk 100, a controller 102, which includes a processor and a memory, and a read write head 104, the movement of which is controlled by controller 102.

Figure 2:
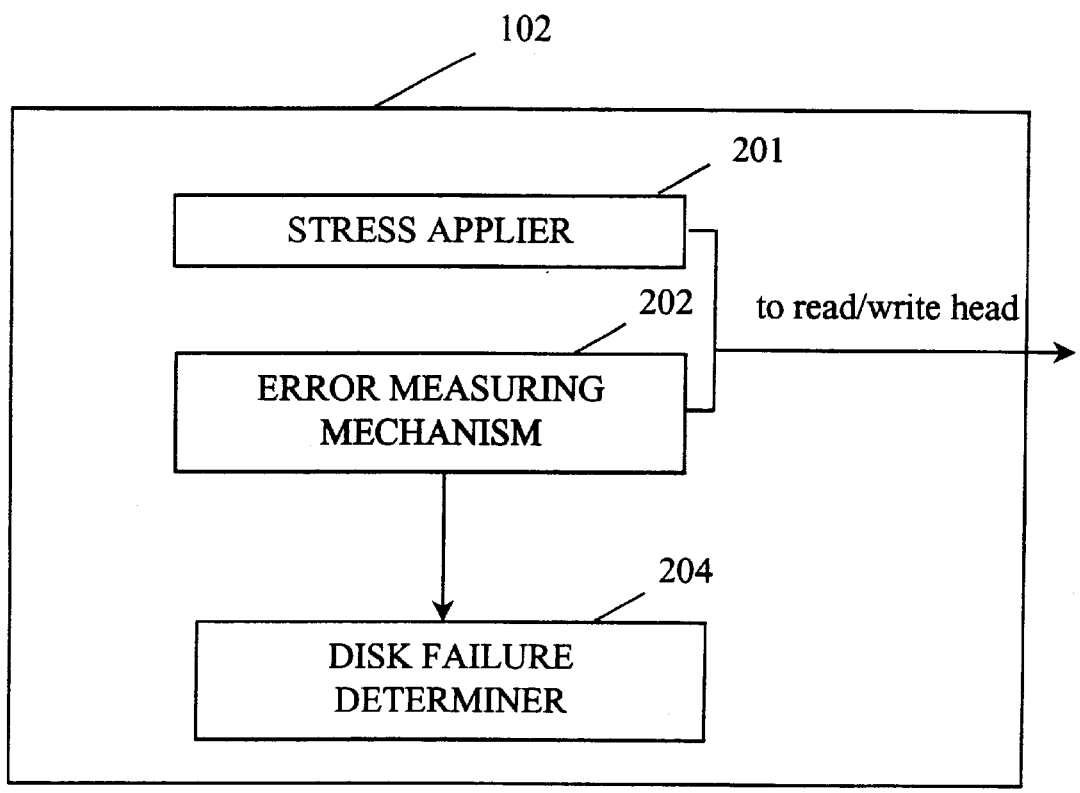
FIG. 2 is a detailed view of the controller shown in FIG. 1.

FIG. 2 is a functional diagram explaining the functions performed by the controller 102. The functions are performed via software or firmware in the described embodiment; however, the functions may be performed by hardware or a combination of hardware, software and firmware. The controller 102 includes stress applier 201 for applying a stress current and resulting magnetic field to the read/write head 104, error measuring mechanism 202, which receives error information from the read write head 104, and a disk failure determiner 204, which analyzes the error measurements and determines when disk failure would occur.

Figure 3:
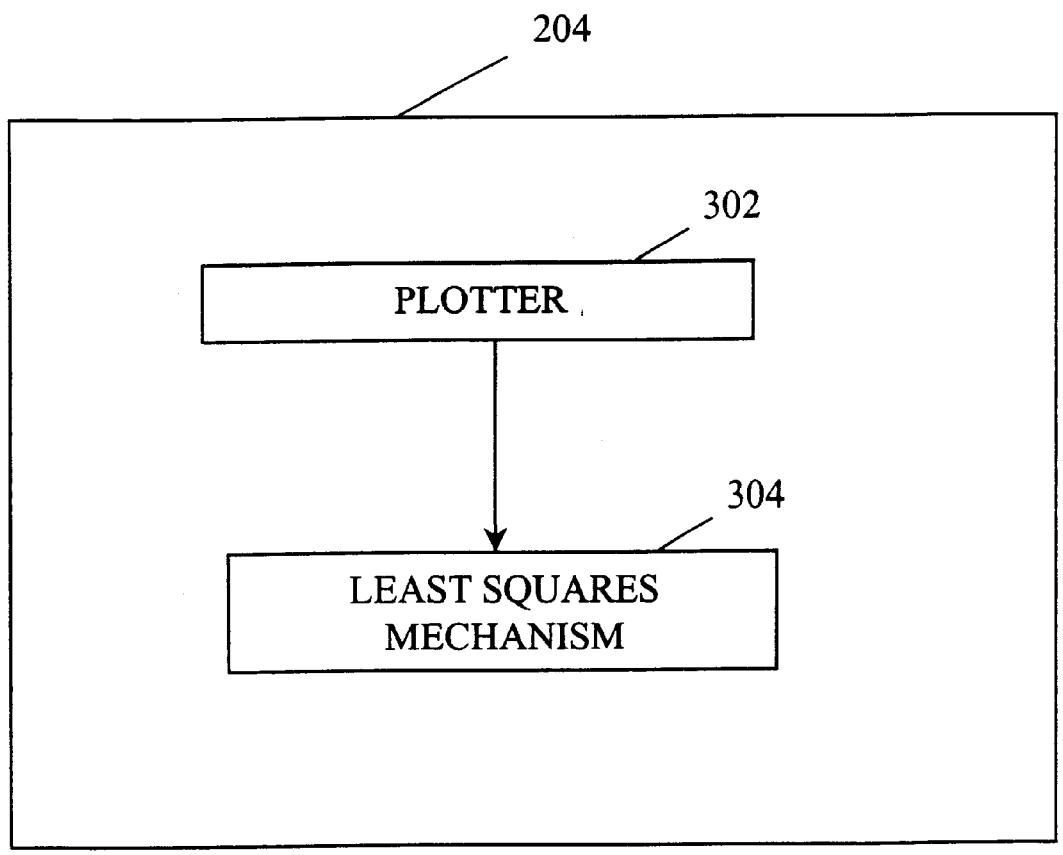
FIG. 3 is detailed view of the disk failure determiner shown in FIG. 2.

FIG. 3 shows a functional diagram of the disk failure determiner 204. Disk failure determiner 204 includes a plotter 302 to plot the Ln (TTF) vs. the respective applied stress current, and least squares fit mechanism 304 to apply a least squares fit line to the plotted Ln TTF) to determine the Ln (TTF) without applying any stress current. Plotter 302 maybe implemented, for example, via software or firmware on the processor within the controller 102.

Figure 4:
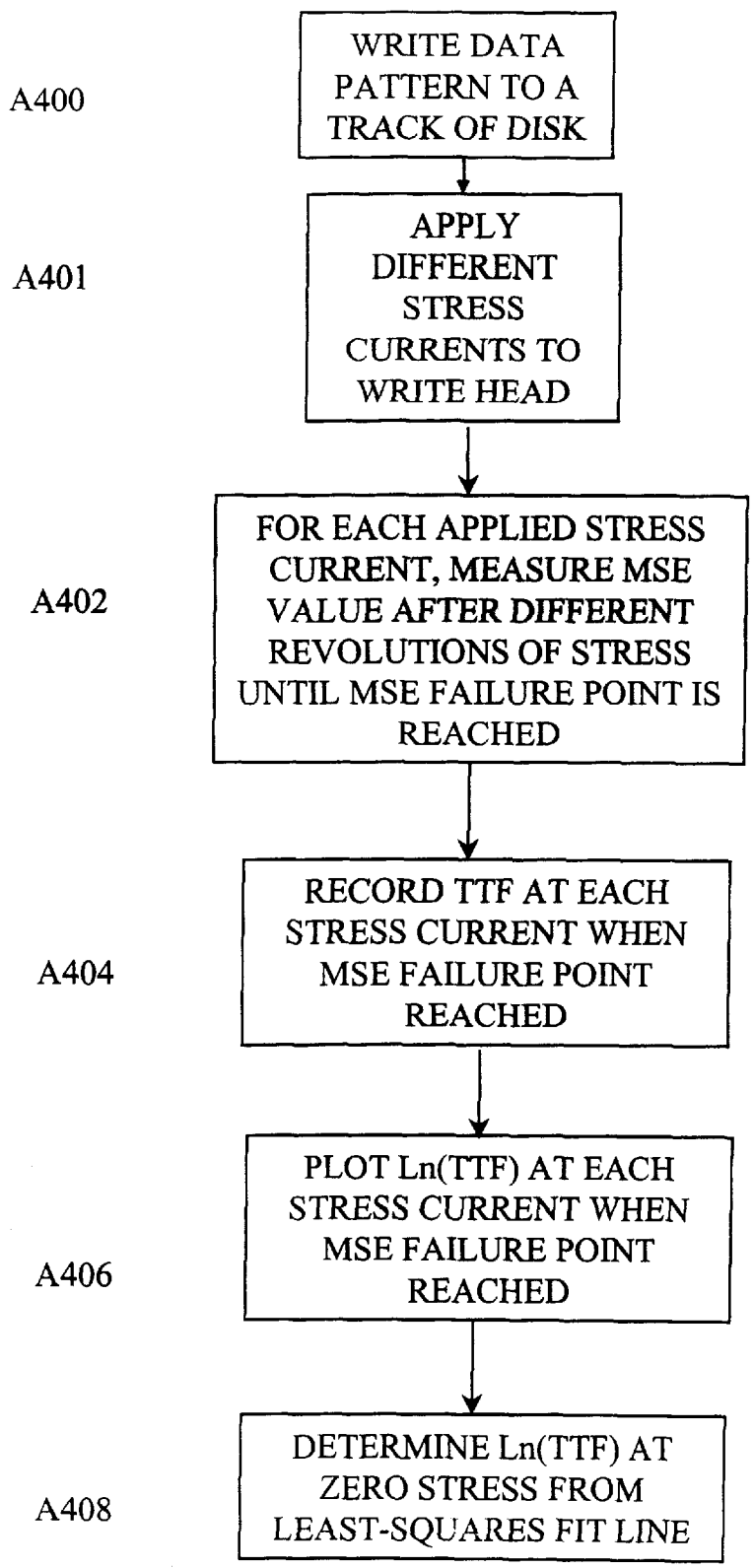
FIG. 4 is a flowchart for explaining the process of determining a thermal decay lifetime for a disk within a disk drive unit.

For drive level testing, values of mean square error (MSE) are used as a failure indicator due to an excellent correlation of MSE with error rate. Due to the use of simple stress acceleration and extrapolation, thermal decay lifetime in drives can be easily determined. FIG. 4 provides a flowchart explaining the process of determining media thermal decay lifetime.

At act A400, a data pattern is written to a track on the disk.

At A401, stress applier 201 applies different stress currents, one at a time, to the write head 104 of the disk drive unit 100 in order to apply a stress magnetic field to the disk.

At A402, after a respective one of the stress currents has been applied, a value of MSE is determined by the error measuring mechanism 202 after different revolutions of the disk. under stress until a predefined MSE failure point is reached. The data pattern is rewritten to the disk after each respective application of a stress current.

At A404, the error measuring mechanism 202, records or saves a corresponding time to failure (TTF) at each of the applied stress currents, each TTF indicates an amount of time until a respective MSE failure point was reached.

At A406, plotter 302 plots, at least internally via the processor and associated memory, the Ln (TTF) vs. the stress current. Such a plot reveals a linear graph, as can be seen by FIG. 10.

At act A408, the Ln (TTF) at zero stress is determined from a least squares fit line passing through the plotted Ln (TTF) vs. stress current.

Figure 10:
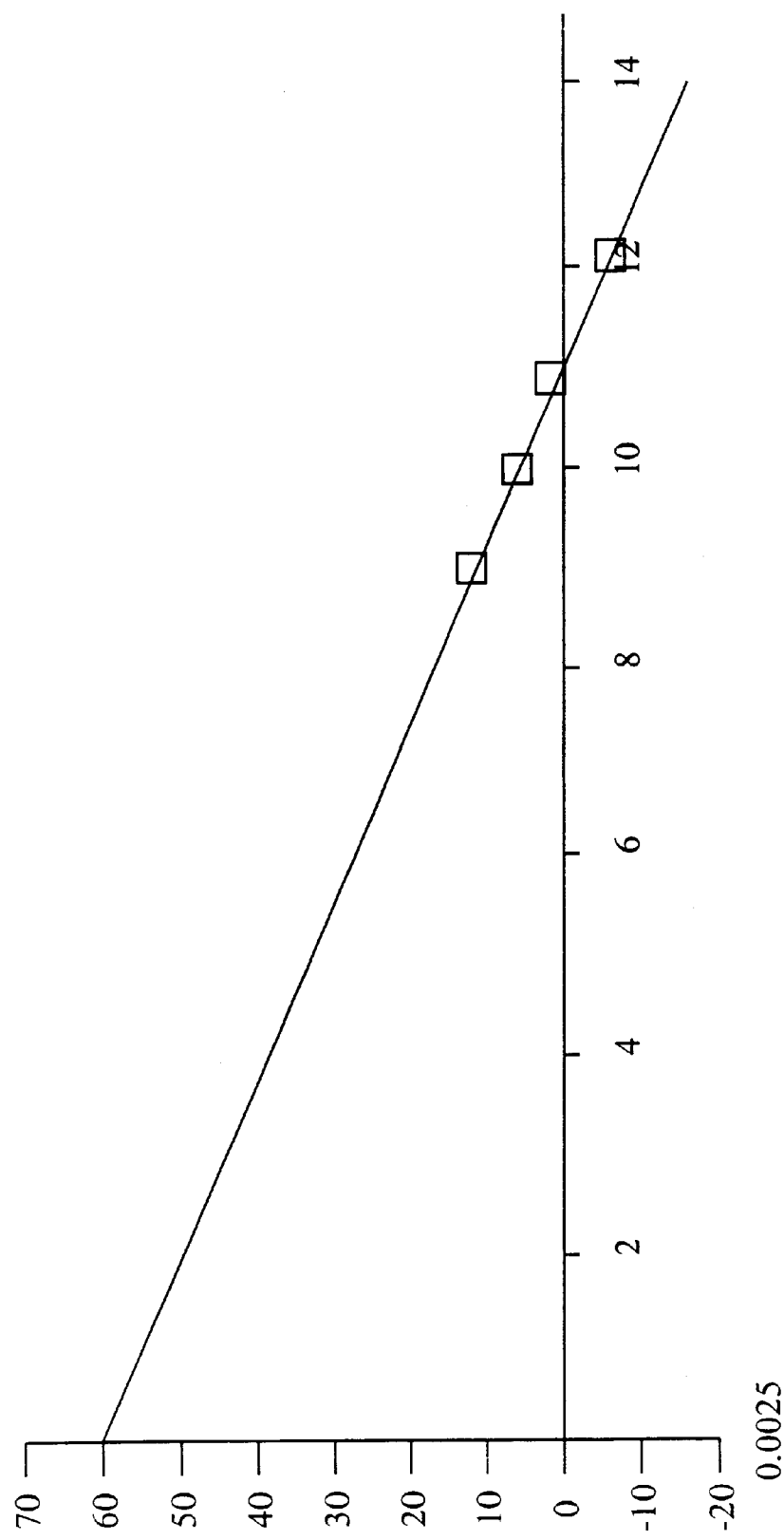
FIG. 10 is an example of a plot of applied stress current vs. Ln(time to failure (hereinafter, TTF)) for a particular disk.

FIG. 10 is an example of a plot of applied stress current vs. Ln(TTF) for a particular disk. The horizontal axis of FIG. 10 represents the applied stress current in milliamps (ma) and the vertical axis represents the Ln(TTF). As is easy to see from FIG. 10, after several points on the graph are determined, a least squares fit line can be determined. Thus, the Ln(TTF) at zero stress can easily be extrapolated and subsequently, TTF at zero stress is easily determined.

Figure 5:
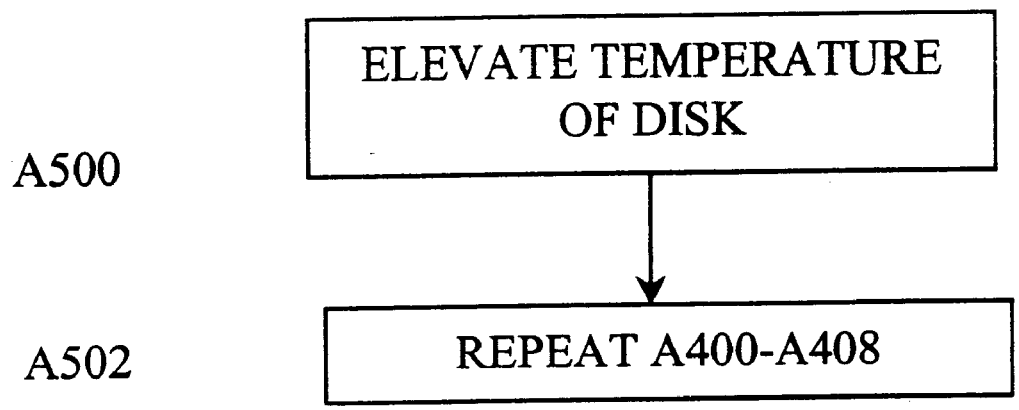
FIG. 5 is a flowchart for explaining the process of determining thermal decay lifetime when the disk is at an elevated temperature.

The above mentioned process can be repeated at different temperatures in order to estimate media thermal decay lifetime under adverse conditions. For example, the disk drive unit and disk can be tested in a 45° C. oven. FIG. 5 shows a flowchart for such a procedure.

At act A500 the disk unit, including the disk, is placed in an oven set for a temperature of, for example, 45° C.

At act A502, acts A400–A408 are repeated in order to determine the Ln (TTF) at zero stress from a least squares fit line for a disk at an elevated temperature, such as 45° C.

Figure 11:
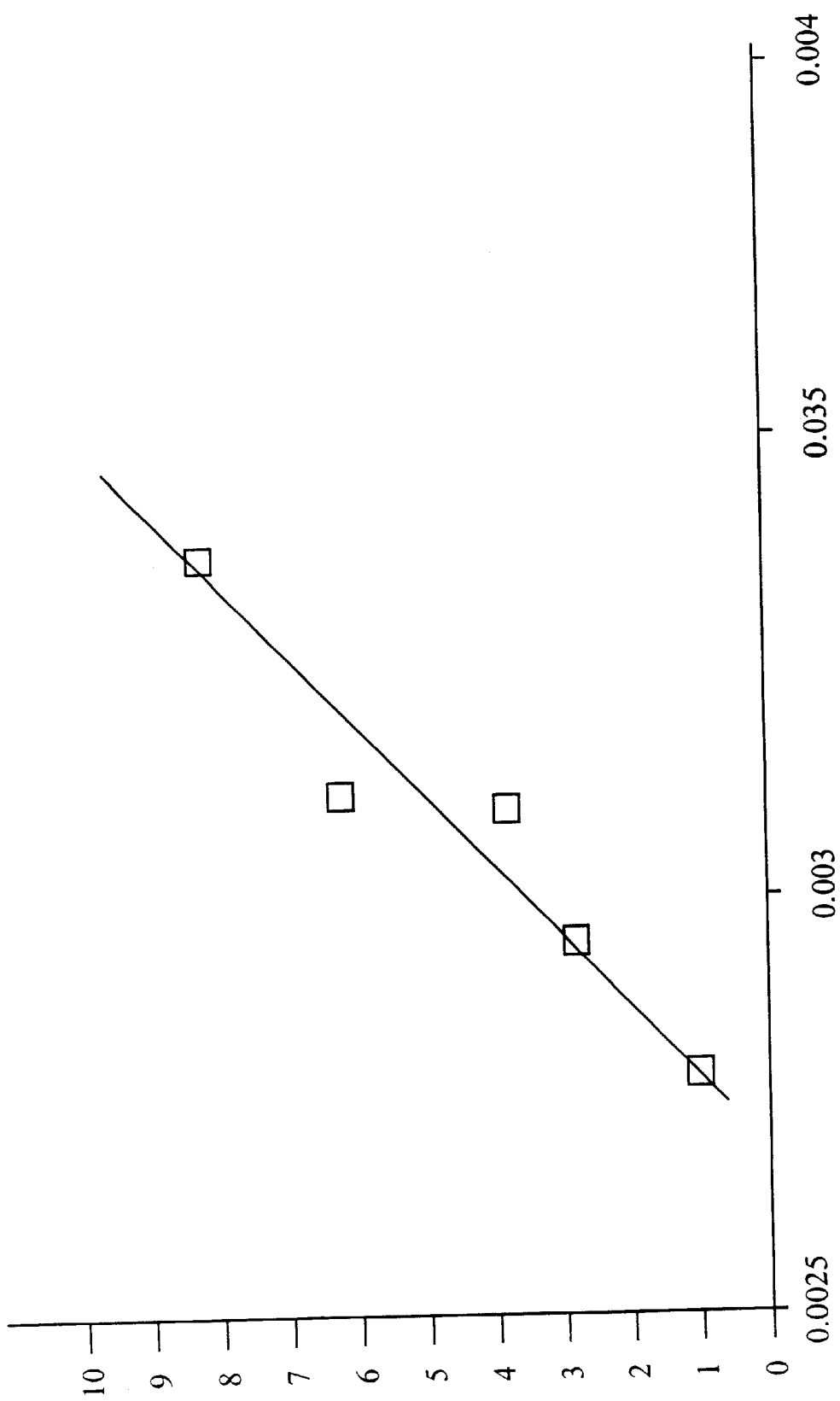
FIG. 11 illustrates a linear relationship between Ln(TTF) and 1(temperature of medium)

The lifetime of thermal decay of a media at any operational temperature can be determined by using the above procedure to determine the TTF at zero stress for at least two different temperatures. As can be seen, FIG. 11 illustrates a linear relationship between Ln(TTF) and 1/(Temperature of Media (hereinafter, $1T_{Media}$)), known as the Arrhenius law. As $T_{Media}$ increases, the TTF decreases, and subsequently, as $1/T_{Media}$, increases, TTF increases. The horizontal axis of FIG. 11 represents values of $1/T_{Media}$, while the vertical axis represents Ln(TTF). FIG. 11 shows a least squares fit line passing through or near the plotted points. Using the least squares fit line, a TTF at any temperature for a particular disk can be determined.

Figure 6:
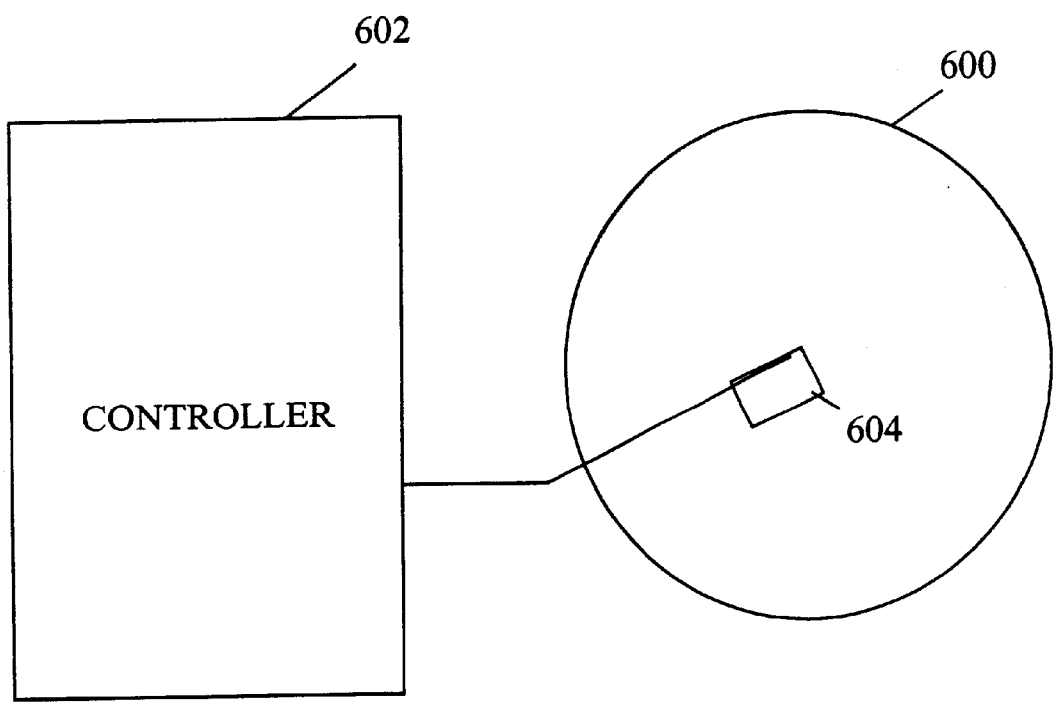
FIG. 6 is a schematic view of a spin stand unit.

The following explains component level testing using a spin stand test. FIG. 6 shows an example of an embodiment in a spin stand test unit. The embodiment includes controller 602 which includes a processor and a computer memory. The controller 602 is attached to a moveable read/write head 604 for reading and writing to a media, such as a disk 600.

Figure 7:
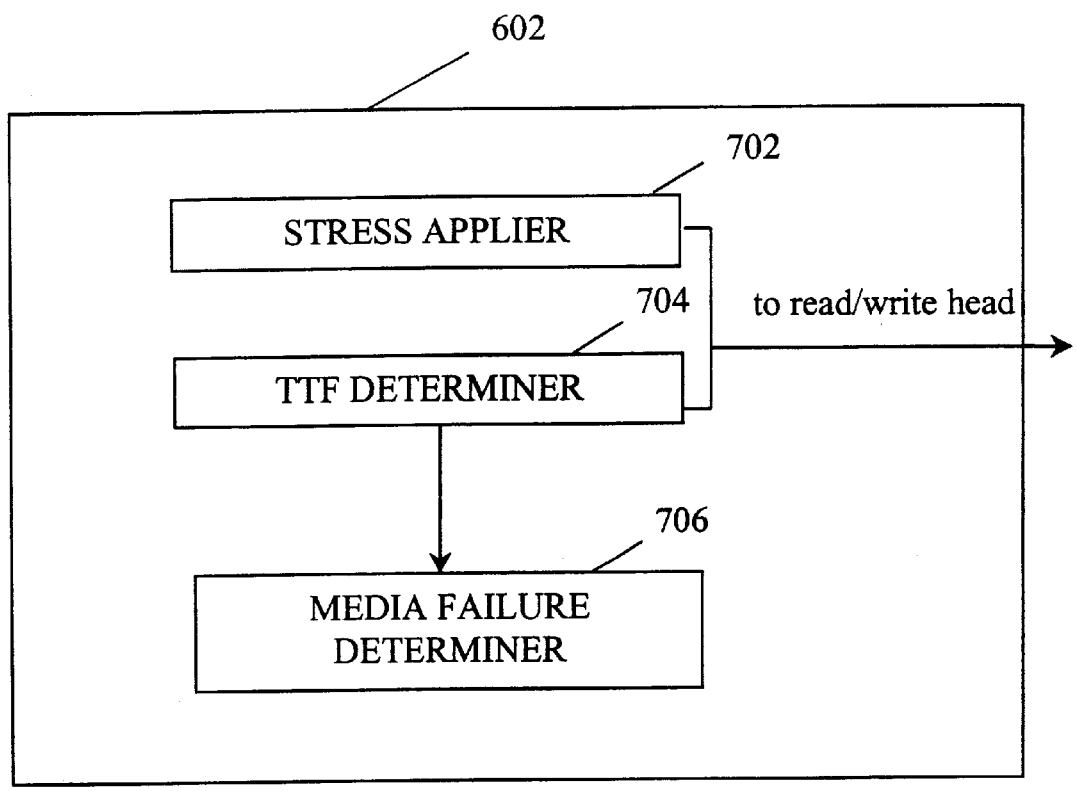
FIG. 7 is a detailed view of the controller shown in FIG. 6.

FIG. 7 illustrates the functional elements of the controller 602. In the illustrated embodiment the functional elements include software or firmware; however, the functional elements may be implemented in hardware or a combination of hardware, software and firmware.

As shown in FIG. 7, the controller 602 includes a stress applier 702 for applying different stress currents, one at a time to a write head 604 for applying the stress current to a disk.

TTF determiner 704 determines the amount of amplitude signal on the disk for each of the applied stress currents and a corresponding amount of exposure time. TTF determiner plots, at least internally, for each applied stress current, the determined normalized amplitude value vs. the corresponding exposure time.

Figure 12:
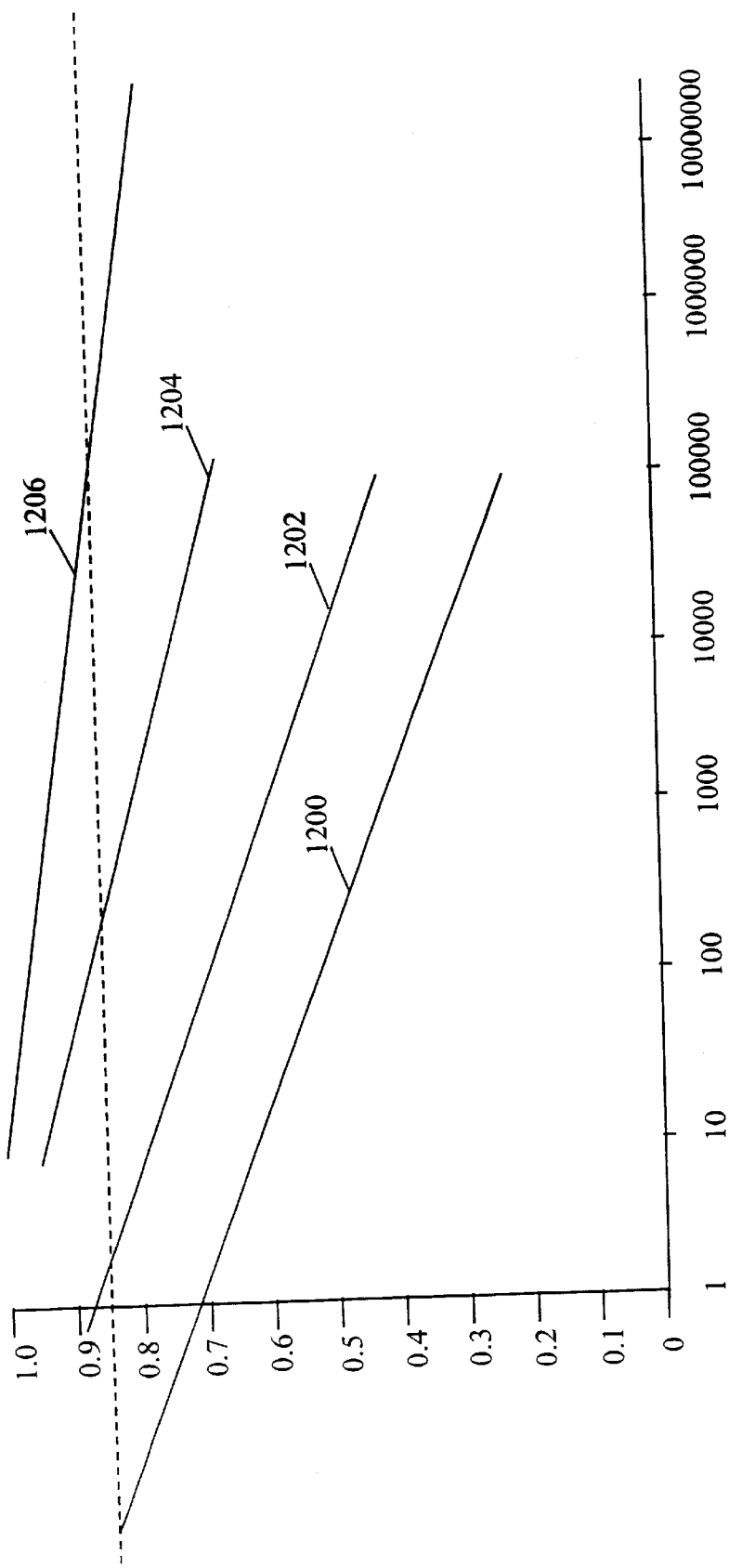
FIG. 12 is an example of a plot of normalized amplitude vs. field exposure time for determining TTF.

FIG. 12 is an example of a plot of normalized amplitude vs. field exposure time for a particular disk, where normalized amplitude is represented along the vertical axis and field exposure time, in microseconds, is represented along the horizontal axis. Line 1200 represents normalized amplitude vs. field exposure time when the stress current is 12 ma, at line 1202 the stress current is 11 ma, at 1204 the stress current is 10 ma, and at 1206 the stress current is 9 ma For this particular disk, a normalized amplitude of 0.85 or less indicates a disk failure. In FIG. 12 the dashed line indicates the failure point for this particular disk.

An amount of amplitude degradation is determined for each applied stress current using different exposure times. Based on the exposure times, TTF determiner determines the TTF for each applied stress current based on a linear relationship of normalized amplitude vs. field exposure, as shown in FIG. 12. The point at which each of the lines 1200, 1202,1204 and 1206 cross the dashed line indicates the TTF for each respective stress current. Thus, the TTF for each respective stress current can be determined, for example, by reading the field exposure time at the point at which each respective line 1200, 1202, 1204 and 1206 crosses the dashed line.

Media failure determiner 706 determines the TTF without a stress current applied based on a linear relationship between the Ln (TTF) vs. stress current, as previously shown in FIG. 10. Thus, by plotting LN(TTF) vs. each respective stress current, TTF at zero stress current can be determined, as previously described.

Figure 8A:
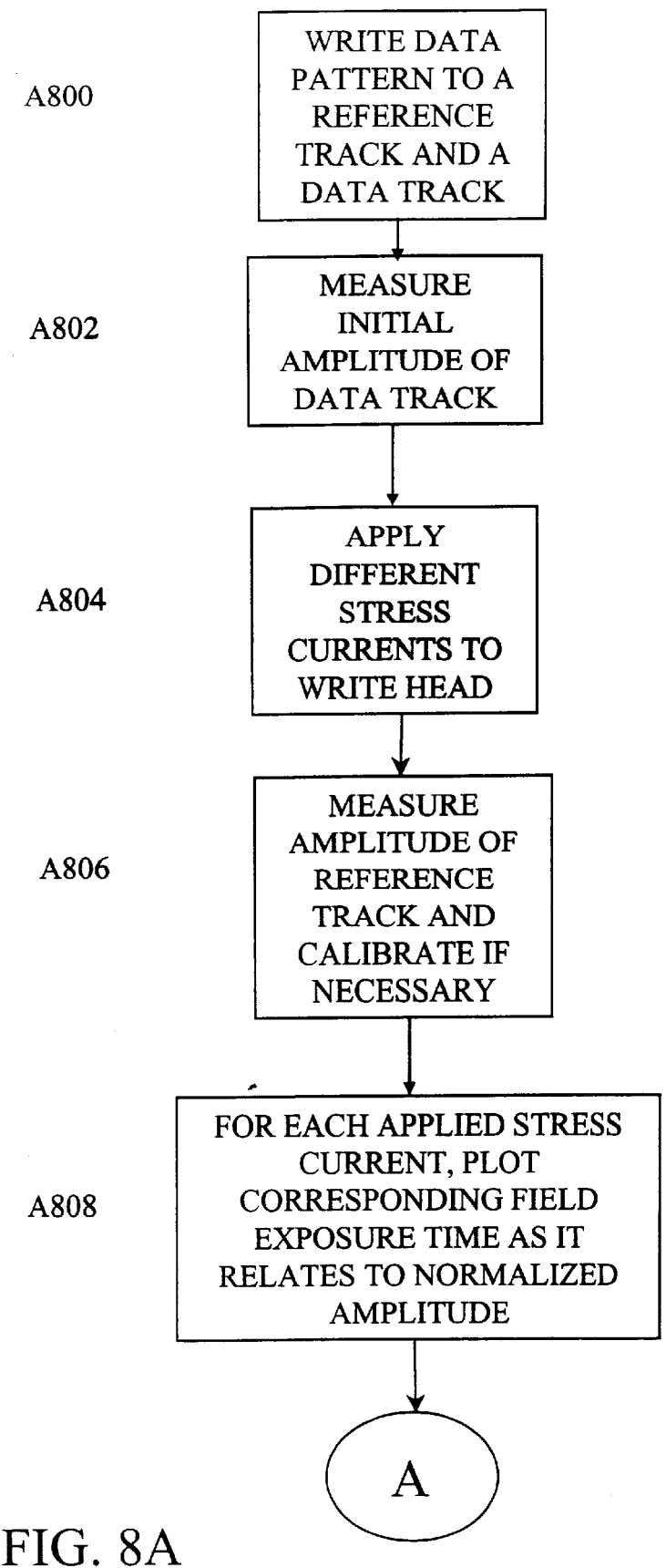
FIGS. 8A to 8B are a flowchart for explaining the process of determining media thermal decay in a spin stand unit.
Figure 8B:
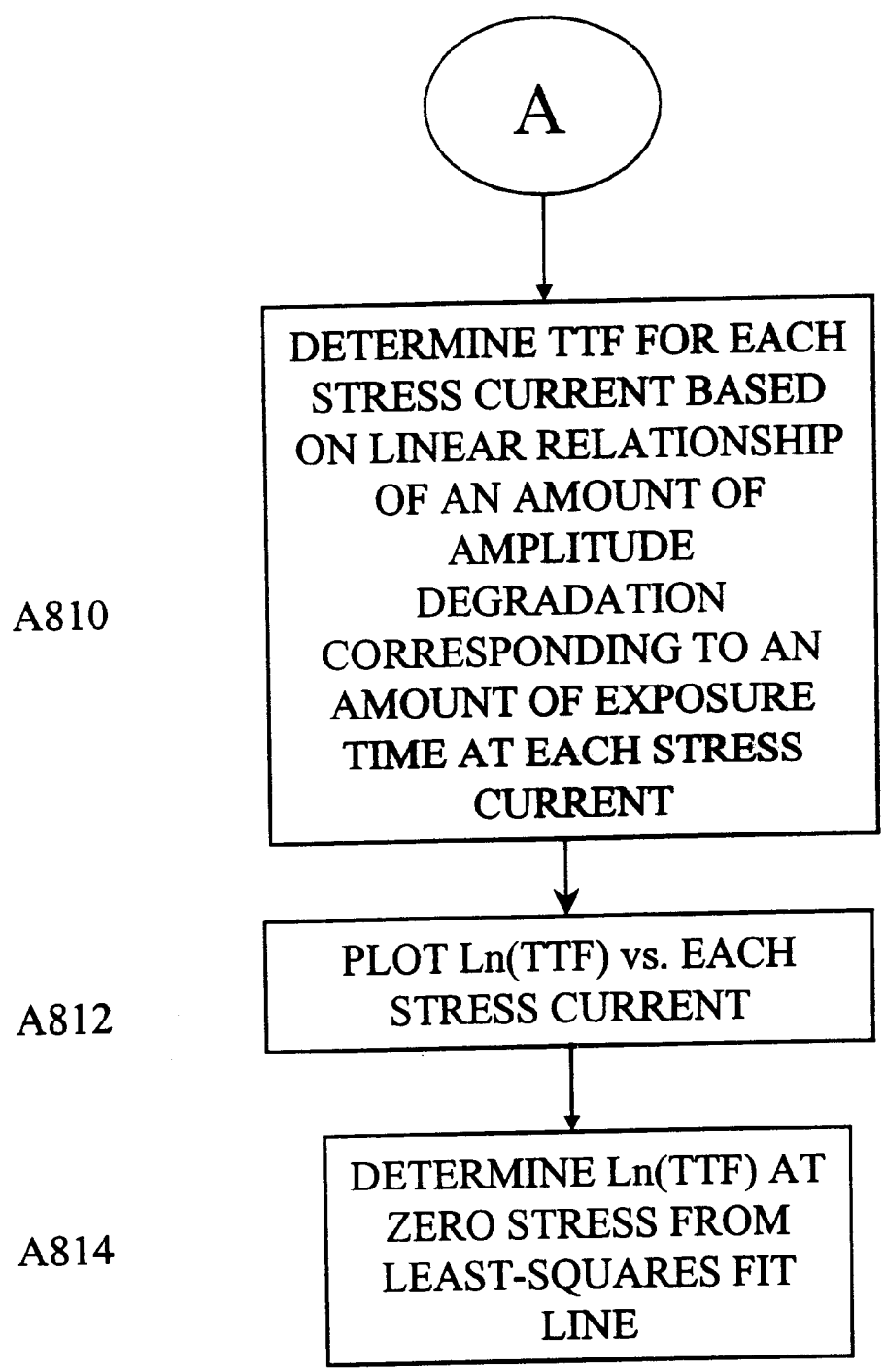

FIGS. 8A to 8B show a flowchart for explaining a process for determining TTF at component level in a spin stand test unit.

At A800, a data pattern is written to a reference track and a data track.

At A802, an initial amplitude of the data track is measured.

At A804, stress applier 702 applies different stress currents, one at a time, to the data track via a read/write head 604, thereby generating a magnetic field on the data track of the disk.

At A806, the amplitude of the reference track is measured. Because no stress current was applied to the reference track, ideally no amplitude degradation should be observed; however, if amplitude degradation is observed, the measured amplitude of the data track should be calibrated accordingly. For example, if a 4% amplitude degradation of the reference track is observed, the measured amplitude of the data track is adjusted or calibrated to be increased by 4%.

At A808, for each applied stress current, the amplitude of the data track is measured and divided by the initial amplitude of the data track to provide normalized amplitude. TTF determiner 704 plots the corresponding field exposure time as it relates to normalized amplitude. See FIG. 12.

At A810, TTF determiner 704 determines TTF for each stress current applied based on a linear relationship of an amount of amplitude degradation corresponding to an amount of exposure time at each applied stress current. For example, TTF determiner 704 determines TTF by plotting field exposure time vs. normalized amplitude, as shown, for example, in FIG. 12. In FIG. 12, the TTF for each respective stress current can be determined by determining the point at which each respective line crosses a predefined failure point, for example the dashed line of FIG. 12.

At A812 plot Ln(TTF) vs. each applied stress current. See FIG. 10.

At A814, determine Ln(TTF) at zero stress, and subsequently, TTF at zero stress, from the least squares fit line.

FIG. 9 is a flowchart for determining TTF under adverse operating conditions in which the temperature of the medium is raised. At act A910 the temperature of the medium is elevated by, for example placing the medium in an oven using a temperature, such as 45° C.

In act A912 acts A800–A814 are repeated in order to determine a TTF without stress at the elevated temperature.

Using a TTF at a first temperature, which is, for example an ambient temperature, and a TTF at an elevated temperature, a TTF at any temperature can be determined by plotting the Ln (TTF) vs. $1/T_{media}$ based on the data collected at ambient temperature and an elevated temperature, as shown in FIG. 11.

While the invention has been described by way of example embodiments, it is understood that the words which have been used herein are words of description, rather than words of limitation. Changes may be made, within the purview of the appended claims, without departing from the scope and spirit of the invention in its broader aspects. Although the invention has been described herein with reference to particular structures, materials, and embodiments, it is understood that the invention is not limited to the particulars disclosed.

The invention extends to all equivalent structures, mechanisms, acts, and uses, such as are within the scope of the appended claims.

We claim as our invention:

1. A method for determining a thermal decay lifetime of a machine-readable medium at a given temperature, the machine-readable medium having information recorded thereon, the method comprising:
    writing a test pattern to a portion of the medium;
    measuring an initial amplitude of signals on the portion of the medium;
    applying a first stress magnetic field to the portion of the medium;
    measuring, after the applying of the first stress magnetic field, a first amplitude of signals on the portion of the medium;
    rewriting the test pattern to the portion of the medium;
    applying a second stress magnetic field to the portion of the medium;
    measuring, after the applying of the second stress magnetic field, a second amplitude of signals on the portion of the medium;
    determining a time to failure corresponding to the, first and the second stress magnetic fields, respectively, the time to failure being an amount of time, measured from a corresponding reference time, for a respective amplitude of the signals on the medium to degrade, in relation to the initial amplitude, beyond a predetermined failure criteria; and
    determining a time to failure without applying a stress magnetic field based on a relationship between the corresponding times to failure determined for each of the applied stress magnetic fields and Ln(the corresponding times to failure).

2. The method of claim 1, wherein the relationship between the corresponding times to failure determined for each of the first and the second applied stress magnetic fields and the Ln(the corresponding times to failure) is linear.

3. The method of claim 1, wherein the acts of applying include passing a current through a write head.

4. The method of claim 1, wherein the acts of applying include passing a magnet over the medium.

5. The method of claim 1, further comprising:
    changing a temperature of the medium to a second temperature; and
    repeating the act of applying the first stress magnetic fields through the act of determining the time to failure without a stress magnetic field in order to determine a time to failure without stress at the second temperature.

6. The method of claim 5, further comprising:
    determining a time to failure at any operational temperature based on the time to failure without stress at the given temperature and the time to failure without stress at the second temperature.

7. The method of claim 6, wherein the determining of the time to failure at any operational temperature includes using a linear relationship between Ln(time to failure) and 1/(temperature of the medium).

8. The method of claim 1, wherein:
    the act of applying the first stress magnetic field comprises applying the first magnetic field for a first exposure time;
    the act of applying the second stress magnetic field comprises applying the second magnetic field for a second exposure time, the first and the second exposure times being different from one another; and
    the act of determining the time to failure corresponding to the first and the second stress magnetic fields comprises, for each of the first applied magnetic field and the second applied magnetic field, plotting the first and the second exposure times as the first and the second exposure times each relate to a corresponding determined amplitude ratio of the signals after the medium is exposed to the corresponding stress magnetic field at a respective one of the exposure times, and the corresponding determined amplitude ratio is based on the initial amplitude and the respective amplitude of the signals.

9. The method of claim 8, further comprising:

changing a temperature of the medium to a second temperature; and repeating the act of applying the first stress magnetic field through the act of determining the time to failure without a stress magnetic field in order to determine a time to failure without stress at the second temperature.

10. The method of claim 9, further comprising:

plotting Ln(time to failure) vs. $1/T_{media}$, where $T_{media}$ is a temperature of the medium, based on the corresponding times to failure determined at the given and the second temperatures in order to determine a time to failure at any operational temperature by using a relationship between Ln(time to failure) and 1/(temperature of the medium).

11. The method of claim 1, further comprising:

measuring an amplitude of signals on a second portion of the medium; and calibrating the respective measured amplitude of signals on the portion of the medium when the measured amplitude of signals on the second portion of the medium is degraded.

12. A method for determining a lifetime of a magnetization pattern on a disk, at a given temperature, within a disk drive, the method comprising:

writing a test pattern to a portion of the disk applying a first stress magnetic field to the portion of the disk;

applying a second stress magnetic field to the portion of the disk;

after each of the acts of applying the first magnetic field and applying the second magnetic field, performing:

measuring an MSE value of the portion of the disk after at least one revolution of the disk, and recording a time to failure, measured from a respective reference time, to a time when the MSE value indicates that a failure point is reached; and determining a time to failure without stress based on the corresponding times to failure for each of the first and the second applied stress magnetic fields, the determining using a relationship between the corresponding times to failure determined for each of the applied stress magnetic fields and Ln(time to failure).

13. The method of claim 12, wherein the relationship between the corresponding times to failure determined for each of the first applied stress magnetic field and the second applied stress magnetic field and Ln(time to failure) is linear.

14. The method of claim 12, wherein the acts of applying include passing a current through a write head.

15. The method of claim 12, wherein the acts of applying include passing a magnet over the medium.

16. The method of claim 12, further comprising:

elevating a temperature of the disk to a second temperature; and repeating the acts of applying the first stress magnetic field through the act of determining a time to failure without stress to determine a time to failure without stress at the second temperature.

17. The method of claim 16, further comprising:

determining a time to failure at any operational temperature based on the time to failure without stress at the first temperature and the time to failure without stress at the second temperature and a linear relationship between Ln(time to failure) and 1/(temperature of the disk).

18. The method of claim 12, wherein the act of determining a time to failure without stress comprises:

plotting Ln(time to failure) vs. a respective one of a first stress current-corresponding to the first applied stress magnetic field and a second stress current corresponding to the second applied stress magnetic field; and applying a least squares fit line to the plotted Ln(time to failure) to determine Ln(time to failure) without applying any of the stress magnetic fields.

19. The method of claim 17, wherein the act of determining a time to failure at any operational temperature comprises:

plotting Ln(time to failure) vs. $1/T_{media}$, where $T_{media}$ is a temperature of the disk, based on the corresponding times to failure determined at the given and the second temperatures in order to determine a time to failure at any operational temperature.

20. A machine-readable medium having information recorded therein, such that when the information is read into a memory of a processor within a disk drive and executed by the processor, the machine-readable information causes the processor to direct the disk drive:

to write a test pattern to a portion of the disk to apply a first stress magnetic field to the portion of the disk;

to apply a second stress magnetic field to the portion of the disk;

after applying the first magnetic field and applying the second magnetic field, causing the processor:

to measure an MSE value of the portion of the disk after at least one revolution of the disk, and to record a time to failure, measured from a respective reference time, to a time when the MSE value indicates that a failure point is reached; and to determine a time to failure without stress based on the corresponding times to failure for each of the first and the second applied stress magnetic fields, the determining using a relationship between the corresponding times to failure determined for each of the applied currents and Ln(time to failure).

21. The medium of claim 20, wherein the relationship between the corresponding times to failure determined for each of the first applied stress magnetic field and the second applied first magnetic field and Ln(time to failure) is linear.

22. The medium of claim 20, wherein when the processor determines a time to failure without stress, the processor:

plots Ln(time to failure) vs. a respective one of a first stress current corresponding to the first applied stress magnetic field and a second stress current corresponding to the second applied stress magnetic field; and applies a least squares fit line to the plotted Ln(time to failure) to determine Ln(time to failure) without applying any of the stress magnetic fields.

23. A machine-readable medium having information recorded therein, such that when the information is read into a memory of a processor within a spin stand unit and executed by the processor, the machine-readable information causes the processor to direct the spin stand unit:

to write a test pattern to a portion of the medium;

to measure an initial amplitude of signals on the portion of the medium;

to apply a first stress magnetic field to the portion of the medium;

to measure, after applying the first stress magnetic field, a first amplitude of signals on the portion of the medium;

to rewrite the test pattern to the portion of the medium;

to apply a second stress magnetic field to the portion of the medium;

to measure, after the applying of the second stress magnetic field, a second amplitude of signals on the portion of the medium;

to determine a time to failure corresponding to the first and the second stress magnetic fields, respectively, the time to failure being an amount of time, measured from a corresponding reference time, for a respective amplitude of the signals on the medium to degrade, in relation to the initial amplitude, beyond a predetermined failure criteria; and to determine a time to failure without applying a stress magnetic field based on a relationship between the corresponding times to failure determined for each of the applied stress magnetic fields and Ln(the corresponding times to failure).

24. The machine-readable medium of claim 23, wherein:

the applying of the first stress magnetic field comprises applying the first magnetic field for a first exposure time;

the applying of the second stress magnetic field comprises applying the second magnetic field for a second exposure time, the first and the second exposure times being different from one another; and the determining of the time to failure corresponding to the first and the second stress magnetic fields comprises, for each of the first applied magnetic field and the second applied magnetic field, plotting the first and the second exposure times as the first and the second exposure times each relate to a corresponding determined amplitude ratio of the signals after the medium is exposed to the corresponding stress magnetic field at a respective one of the exposure times, and the corresponding determined amplitude ratio is based on the initial amplitude and the respective amplitude.

25. An apparatus comprising:

a read/write head for writing to a medium;

a mechanism for applying different stress magnetic fields to the medium;

a controller to control an application of the different stress magnetic fields via the mechanism, the controller comprising:

a stress applier to apply different stress magnetic fields to the medium via the mechanism, a TTF determiner to determine a time to failure corresponding to each of the different stress magnetic fields, the time to failure being an amount of time, measured from a corresponding reference time, for a respective amplitude of signals on the medium to degrade, in relation to an initial amplitude, beyond a predetermined failure criteria, and a media failure determiner to determine a time to failure without applying stress magnetic field based on a relationship between the corresponding times to failure determined for each of the different stress currents and Ln(time to failure).

26. The apparatus of claim 25, wherein the relationship between the corresponding times to failure determined for each, of the different stress currents and Ln(time to failure) is linear.

27. A disk drive unit comprising:

a read/write head to read and write to a portion of a disk;

a controller to control an application of a plurality of stress magnetic fields, applied one at a time, to the disk, the controller further comprising:

a stress applier to apply different stress magnetic fields to the disk via the read/write head, an error measuring mechanism to measure an MSE derived from a signal read from the disk via the read/write head and to determine and save a time at which the MSE value indicates that a failure point is reached, and a disk failure determiner to determine a time to failure without an application of any of the stress magnetic fields based on the corresponding saved times at which the corresponding MSE value indicated that the failure point was reached and on a relationship between the corresponding times at which the MSE value indicates that a failure point is reached for each of the different stress currents and Ln(time to failure).

28. The disk drive of claim 27, wherein the relationship between the corresponding times at which the MSE value indicates that a failure point is reached for each of the different stress magnetic fields and Ln(time to failure) is linear.

29. The disk drive of claim 28, wherein the disk failure determiner comprises:

a plotter to plot Ln(the saved time) vs. the respective applied stress magnetic field, and a least squares fit mechanism to apply a least-squares fit line to the plotted Ln(the saved time) to determine the Ln(the saved time) without applying any of the stress magnetic fields.

* * * * *